(12) United States Patent
McCoy

(10) Patent No.: US 7,806,629 B2
(45) Date of Patent: Oct. 5, 2010

(54) SIDE LOADING CONDUIT SPACER

(75) Inventor: Donald P. McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 607 days.

(21) Appl. No.: 11/747,739

(22) Filed: May 11, 2007

(65) Prior Publication Data

US 2008/0279635 A1    Nov. 13, 2008

(51) Int. Cl.
- F16L 7/00   (2006.01)
- F16L 3/02   (2006.01)
- F16L 3/22   (2006.01)

(52) U.S. Cl. .................. 405/184.4; 405/183.5; 405/184; 211/60.1; 211/70; 248/68.1; 248/74.2

(58) Field of Classification Search .............. 405/183.5, 405/184, 184.4; 211/60.1, 70; 248/49, 65, 248/68.1, 74.1, 74.2
See application file for complete search history.

(56) References Cited

U.S. PATENT DOCUMENTS

| | | | |
|---|---|---|---|
| 2,462,399 A | 2/1949 | Hinchman | |
| 2,686,643 A | 9/1954 | Bloom et al. | |
| 2,849,027 A | 8/1958 | Tetyak | |
| 2,937,833 A | 5/1960 | Sachs | |
| 3,523,667 A | 8/1970 | Guerrero | |
| 3,643,005 A | 2/1972 | Mathews | |
| 3,856,246 A | 12/1974 | Sinko | |
| 3,964,707 A | 6/1976 | Lewis | |
| 4,183,484 A | 1/1980 | Mathews | |
| 4,244,542 A | 1/1981 | Mathews | |
| 4,306,697 A | 12/1981 | Mathews | |
| 4,601,447 A | 7/1986 | McFarland | |
| 4,618,114 A | 10/1986 | McFarland | |
| 4,647,251 A * | 3/1987 | Gale | 405/184.4 |
| 4,941,773 A * | 7/1990 | Vergouw | 405/157 |
| 5,028,019 A * | 7/1991 | Hardtke | 248/55 |
| 5,104,072 A | 4/1992 | Kuo et al. | |
| 5,137,306 A | 8/1992 | Flood | |
| 5,372,388 A | 12/1994 | Gargiulo | |

(Continued)

FOREIGN PATENT DOCUMENTS

CA    1308788    10/1992

OTHER PUBLICATIONS

Office Action dated Jul. 30, 2008 for Canadian Counterpart Appl. No. 2587862.

*Primary Examiner*—Tara Mayo-Pinnock
(74) *Attorney, Agent, or Firm*—David W. Okey

(57) ABSTRACT

Apparatuses and methods are disclosed for mounting conduits within spacers for underground installation. Spacers for side loading of conduit, as opposed to older methods of end loading, allow construction workers to easily assemble conduits to a plurality of spacers above-ground. The side loading technique uses spacers having bores that communicate with each other, preferably in a radial manner. Thus, a first plurality of conduits may be assembled or mounted to an inner portion of the spacers and then at least a second plurality of conduits may be assembled and mounted to an outer portion of the spacers. Cables later pulled through the conduits are typically those used for the transmission of electricity or communication signals. Other embodiments use bores that do not communicate with each other but are secured to the spacers with an outer banding saddle.

31 Claims, 8 Drawing Sheets

U.S. PATENT DOCUMENTS

| | | |
|---|---|---|
| 5,605,419 A | 2/1997 | Reinert, Sr. |
| 5,875,999 A * | 3/1999 | Smart .......................... 248/49 |
| 5,992,802 A * | 11/1999 | Campbell ................. 248/68.1 |
| 6,076,863 A | 6/2000 | Platt Brown et al. |
| 6,242,700 B1 | 6/2001 | Smith |
| 6,248,953 B1 | 6/2001 | Miller |
| 6,375,017 B1 | 4/2002 | Schattner et al. |
| 6,711,328 B2 | 3/2004 | Griffioen et al. |
| 7,140,500 B2 | 11/2006 | McCoy |
| 2002/0185459 A1 * | 12/2002 | Dietrich ..................... 211/70.6 |

* cited by examiner

SIDE LOADING CONDUIT SPACER

BACKGROUND

This patent concerns spacers used for the installation and spacing of communications and power cables under the ground and above ground. Cables for electric power and communication lines are run underground in order to protect them from above-ground elements and from the interference and damage they would suffer when installed above the ground or on poles or structures.

Power and communication distribution cables are typically routed aboveground. They are routed underground when for various reasons, aboveground routes are not permitted or are not possible. Most underground power and communication cables for private homes are dug directly. Power and communications cables for mission-critical installations receive more circumspect treatment. These installations include hospitals, airports, military bases, and major electric transmission lines. For most of these installations, an open cut trench is dug, conduit is placed in the lower portion of the trench in an organized and controlled separation bank, and the conduit is then encased in concrete forming what is commonly known as a concrete encased duct bank. The conduit is most often a round pipe made from plastic but on occasion may be of other shapes and material. Typically, the top of the duct bank is two feet or more below grade. The area between the top of the duct bank and grade is backfilled with sand, gravel, soil, or other appropriate fill. Power or communication cables or both are then pulled into the conduits.

In some instances, however, it is not possible to route an open-cut trench directly to the desired location without disruption. It may therefore be necessary to cross under a highway, a railroad, a waterway, or other obstruction. For these installations, a tunnel must be dug underneath, typically by digging a straight bore or by using directional drilling. A straight bore is typically used for relatively straight installations of less than 500 feet (150 m). After the bore is dug, a casing, typically made of steel, is pulled through the bore and conduit with spacers is pulled into the casing. Directional drilling is typically used for longer bores. In these installations, steel or other casing is most often used, but some installations are casingless. The directionally drilled casingless installation method is typically selected when the extra protection offered by a casing and grout is not deemed necessary and economy of the installation is of prime importance.

Underground conduits typically are placed in casings made of steel, high-density polyethylene (HDPE), concrete, fiberglass-reinforced thermoset polymers, or centrifugally-cast fiberglass reinforced polymers. Other casing materials may also be used. Casing lengths may range from 10 feet to 3,000 feet (3 to 920 m) or longer, with diameter from 4 inches to 60 inches (10 to 150 cm), or larger. The conduits themselves are typically made from high density polyethylene (HDPE), polyvinyl chloride (PVC), fiberglass reinforced epoxy. Other conduit materials may be used. Conduit-in-casing installations are used to route communications and power cables under highways, streams and rivers, railroad track, and other obstructions that, for one reason or another, may not be disturbed. Underground power and communications cables are typically placed in directionally-drilled tunnels or straight-bored tunnels.

Directionally drilled holes normally used for conduit-in-casing installations or casingless installations refer to a tunnel that starts at grade or in a pit that is slightly below grade. The tunnel goes downward at approximately a 20° angle until it is low enough to go under the obstruction. The obstruction may be 100 feet (30 m) or more below grade. When the tunnel is low enough to go under the obstruction it turns gently and then follows a line parallel to grade. When the tunnel has cleared the obstruction, it sweeps upward at an angle, typically about 40°, and exits at grade.

In order to prepare a directionally drilled hole, construction crews start first with a pilot hole. After the pilot hole is installed, reamers of successively larger size are pulled through the hole until the hole is approximately 50% larger than required for the duct bank or casing. As the reamers are pulled through, the hole is kept full of mud made with Bentonite to keep the tunnel from caving in or filling with water. Bentonite is a natural clay found in the earth's strata. After the directionally bored hole is completed, the duct bank is pulled into place displacing part of the Bentonite.

Straight bores may be prepared in many ways, but are most often accomplished as follows. A boring pit is dug on one side of the obstruction, and a receiving pit on the other side. A length of auger is placed inside steel casing having a similar length and slightly large outer diameter. The auger and casing are placed into the boring pit. Using a special purpose boring machine, which is usually track-mounted, the casing is hydraulically jacked in the direction of the receiving pit while rotating the auger to remove the earth from inside the casing. Successive lengths of casing are welded to each other and successive lengths of auger are attached to remove earth from the casing. When the casing and auger reach the receiving pit, the augers are removed.

Meanwhile, an assembly of the conduits is prepared, the assembly including the conduits and spacers to maintain separation of the conduit in the casing. The spacers are placed along every several feet of conduit length. The assembly of conduits and spacers is then pulled into the casing and grout is placed between the casing and the conduit, filling the space in between them. Grout is a fluid mixture of sand, cement and water. Special additives are sometimes used to make the grout very fluid, to enhance thermal conductivity, or to slow hydration or curing of the grout. After the grout has hydrated, power and communications cables are pulled through the conduits.

One technique used to fill the space is known as the sacrificial grout injection pipe technique. This technique requires multiple sacrificial grout injection pipes or hoses, normally made from 2 inch or 3 inch diameter HDPE or PVC, that are successively placed along the length of the duct bank. Grout is pumped into the end of each grout pipe in turn until the space in the casing is filled with grout over the full length of the casing. When the space that is reached by one grout pipe is filled, the next pipe or hose is used until the entire space in the casing has been filled with grout.

A number of methods have been devised for organization and separation control of conduits for open cut trench concrete encased duct banks. Many of these methods are depicted in the following patents: U.S. Pat. Nos. 2,462,399; 2,686,643; 2,937,833; 3,523,667; 3,643,005; 3,856,246; 3,964,707; 4,183,484; 4,244,542; 4,306,697; 4,601,447; 4,618,114; 5,104,072; and 5,605,419. These prior art spacers and concrete encased duct bank installation methods hold the conduits vertically and horizontally, but do not provide for longitudinal restraint, probably because these patents envision filling an open cut trench with concrete or grout from above, not from the side as would be the case in a closed casing or directionally-bored hole.

U.S. Pat. Nos. 5,137,306, 5,372,388, 6,076,863 and 6,711,328 depict conduits separated by spacers that are placed inside a casing. These patents related to very small conduits for fiber optic cables. Since fiber optic cables do not generate any heat, so no provision is made in these designs for placement of grout between the conduit outer diameter and the casing inner diameter.

What is needed is a better way of spacing and holding apart conduits for power and communications cables in underground or confined installations. The improved method should allow for controlled spacing and excellent heat conduction, while providing an efficient, economical, and easy way to install the conduits.

SUMMARY

There are many embodiments of the invention. One embodiment is a side-loading spacer. The side-loading spacer includes a first single-wall spacer and optionally a second single-wall spacer. Each spacer includes a) i. a hub having a center; ii. a plurality of arms radiating from the hub; iii. a first plurality of bores defined by and between the arms; and iv. a second plurality of bores defined by and between the arms, wherein the second plurality is spaced a greater distance from the center than the first plurality. If there is a second single-wall spacer, the side-loading spacer also includes b) a plurality of spacer bushings, and c) a plurality of fasteners for assembling and spacing apart the first single-wall spacer and the second single-wall spacer with the plurality of bushings by a length of the bushings, to form an assembly of a double-wall spacer.

Another embodiment includes a side-loading spacer including a first single-wall spacer and optionally a second single-wall spacer. Each single-wall spacer includes i. a hub having a center, ii. a plurality of arms radiating from the hub, iii. a first plurality of bores defined by and between the arms, and iv. a second plurality of bores defined by and between the arms, wherein the second plurality is spaced a greater distance from the center than the first plurality, and wherein each bore of the first plurality is in radial communication with a bore of the second plurality. If there is a second single-wall spacer, the side-loading spacer also includes a plurality of spacer bushings, and a plurality of fasteners for assembling and spacing apart the first single-wall spacer and the second single-wall spacer with the plurality of bushings by a length of the bushings to form a double-wall spacer.

Another embodiment is a side-loading spacer. The side loading spacer includes a first single-wall spacer and optionally a second single-wall spacer. Each of the first and second single-wall spacers includes i. a hub having a center, ii. a plurality of arms radiating from the hub, iii. a first plurality of bores defined by and between the arms, iv. a second plurality of bores defined by and between the arms, wherein the second plurality is spaced a greater distance from the center than the first plurality, and wherein each bore of the first plurality is in communication with a bore of the second plurality, and at least one separation saddle configured for mounting over a conduit mounted in one of the first plurality of bores, said separation saddle also configured for mounting at least one additional conduit. If there is a second single-wall spacer, the side-loading spacer also includes a plurality of spacer bushings, and a plurality of fasteners for assembling and spacing apart the first single-wall spacer and the second single-wall spacer with the plurality of bushings by a length of the bushings, to form an assembly of a double-wall spacer.

Another embodiment is a side-loading spacer. The side loading spacer includes a) a first single-wall spacer and optionally a second single-wall spacer, each single-wall spacer including: i. a hub having a center, ii. a plurality of arms radiating from the hub, iii. a plurality of bores defined by and between the arms; and, iv. at least one banding saddle configured for securing at least one conduit to the spacer; and if there is a second spacer. The side loading spacer also includes b) a plurality of spacer bushings, and c) a plurality of fasteners for assembling and spacing apart the first spacer and the second spacer with the plurality of bushings by a length of the bushings, wherein the first single-wall spacer and the second single-wall spacer form an assembly of a double-wall spacer.

Another embodiment is a side-loading spacer. The spacer includes a) a first and a second single-wall spacer, each single-wall spacer including i. a hub having a center, ii. a plurality of arms radiating from the hub, iii. a plurality of bores defined by and between the arms, and iv. at least one banding saddle configured for securing at least one conduit to the spacer. There is also b) a plurality of spacer bushings, and c) a plurality of fasteners for assembling and spacing apart the first and second single-wall spacers with the plurality of bushings to form an assembly of a double-wall spacer.

Another embodiment is a method of using a side-loading spacer for loading conduit into a plurality of side-loading spacers for placement into a casing, a tunnel, or a longitudinal arcuate hole. The method includes furnishing a plurality of side-loading spacers, each side-loading spacer including a first single-wall spacer and optionally a second single-wall spacer. Each of the first and second single-wall spacers includes i. a hub having a center; ii. a plurality of arms radiating from the hub; iii. a first plurality of bores defined by and between the arms; and iv. a second plurality of bores defined by and between the arms, wherein the second plurality is spaced a greater distance from the center than the first plurality. If there is a second single-wall spacer, the side loading spacer also includes a plurality of spacer bushings and a plurality of fasteners for assembling and spacing apart the first single-wall spacer and the second single-wall spacer with the plurality of bushings by a length of the bushings, to form a double-wall spacer.

The method also includes placing a first plurality of conduits into the first plurality of bores of the plurality of side-loading spacers, and placing a second plurality of conduits into the second plurality of bores of the plurality of side-loading spacers.

Another embodiment is a method of side loading conduit into side-loading spacers for placement into a casing, a tunnel, or a longitudinal arcuate hole. The method includes furnishing a plurality of side-loading spacers, each side-loading spacer including a) a first single-wall spacer and optionally a second single-wall spacer, each single-wall spacer including: i. a hub having a center, ii. a plurality of arms radiating from the hub, iii. a plurality of bores defined by and between the arms, and iv. at least one banding saddle configured for securing at least one conduit to the first single-wall spacer. If there is a second single-wall spacer, the side loading spacer also includes b) a plurality of spacer bushings, and c) a plurality of fasteners for assembling and spacing apart the first single-wall spacer and the second single-wall spacer with the plurality of bushings by a length of the bushings to form a double-wall spacer. The method also includes placing a plurality of conduits into the plurality of bores of the plurality of side-loading spacers, and securing the plurality of conduits to the side-loading spacers or to themselves by banding the conduits around an outside of the at least one banding saddle.

Additional features and advantages are described herein, and will be apparent from, the following Detailed Description and the figures.

DETAILED DESCRIPTION

Figure 1A:
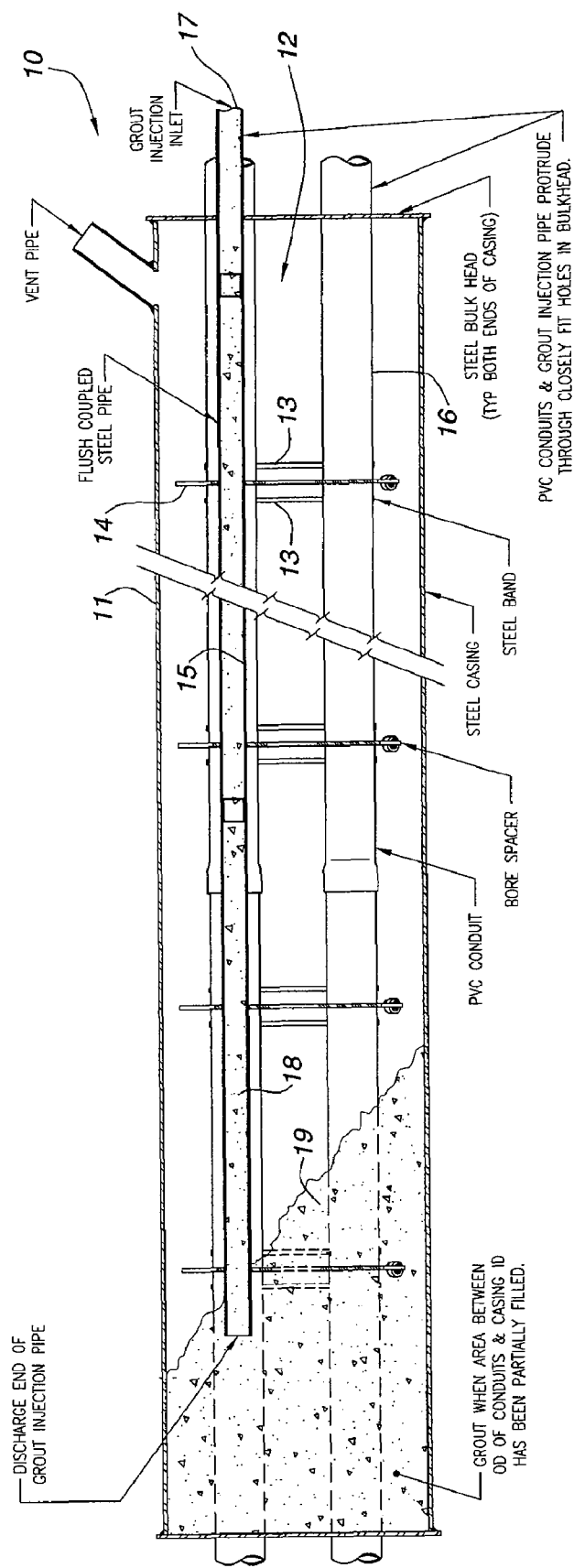
FIGS. 1a and 1b depict uses of underground conduits and spacers with injectable grout pipe techniques.

The preparation and execution of underground grouting installations for power and communications cables is not something for the faint of heart. As described above, thousands of pounds of cabling, conduit and wire bundles must be securely and safely installed. Installations sometimes range into the thousands of feet. Grout is blindly and horizontally injected at a high pressure into a casing, such as a casing made or steel or other material, through at least many hundreds of feet, and as noted, sometimes a thousand feet or more from each side. A typical installation, showing the single end extractable grout injection pipe method of injecting grout, is depicted in FIG. 1a. Underground conduit site 10 includes casing 11, typically between 12 and 48 inches (30 to 120 cm) in diameter, and now perhaps even up to 60 inches or more (150 cm). A passage is dug into the ground and the casing is then placed into the ground. An assembly 12 of conduits 16 for several power or communications cables, or both, and a grout injection pipe, is then assembled to a plurality of spacers 14, such as single-wall bore spacers, of which the term single-wall is explained below. The spacers are used to insure minimum distances between conduits for power cables to allow for heat dissipation and also to minimize EMI/RFI interferences. The spacers are also used to support the grout pipe.

The conduits are typically mounted to the spacers and then held in place by fasteners or banding 13 placed around the cables or the spacers, or both. Grout 18 is injected by grouting pumps through a grout injection inlet 17 and pumped through grout pipes 15. As noted, the grout may need to be pumped many hundreds of feet. The grout eventually reaches the area 19 downstream at the end of the grout pipe and fills the space in the casing 11 that is not otherwise occupied by conduits, or spacers.

Figure 1B:
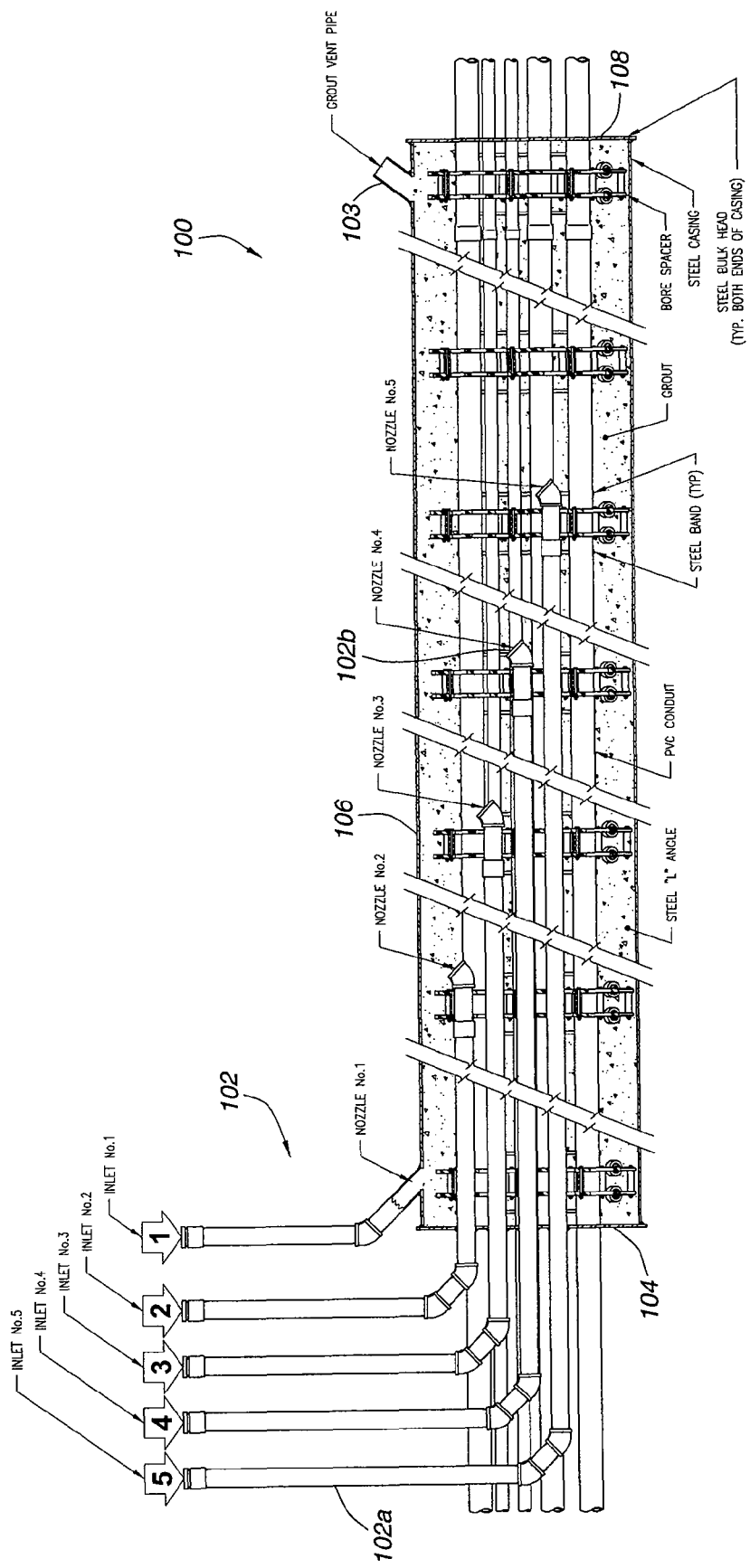

FIGS. 1a and 1b depict two distinct prior art methods for filling casings with grout, the single end extractable grout injection pipe technique, in FIG. 1a, and the single end sacrificial grout injection pipe method in FIG. 1b.

The single extractable grout injection pipe technique, depicted in FIG. 1a, is accomplished by installing an injection pipe from the boring end of the casing to a point just a few feet short of the receiving end of the casing. The injection pipe is installed in the casing along with the conduits and bore spacers. The extractable grout injection pipe is supported by, but is not attached to the bore spacers. With this technique, the outer diameter of the extractable injection pipe must be smooth over its full length to insure that it will ride without hindrance through and/or over the bore spacers. The injection pipe may be flush-coupled steel, lengths of steel pipe that have been welded together or a single continuous length of heavy wall HDPE pipe. Heavy wall PVC Conduit is on occasion used but the belled ends that are used to connect the sections of PVC conduit together cause a hindrance in the extraction.

Both ends of the casing are closed off or bulk headed. The conduits extend through closely fitted holes in the bulkheads. The grout injection pipe fits through an oversize hole in bulkhead located on the boring end of the casing. From the boring end of the casing, grout is pumped into the grout injection pipe. As the area between the conduit outer diameters and casing inner diameter is filled, the grout the injection pipe is withdrawn. The discharge end of the grout injection pipe is kept embedded in the grout slurry at all times to avoid air pockets. The grout is pumped through the injection pipe under sufficient pressure to fill all open spaces but not high enough to cause the conduits to collapse or pull apart. After the grout has hydrated and hardened, power cables or communication cables are pulled into the conduits.

The other generally-used technique is the single end sacrificial grout injection method, depicted in FIG. 1b. This method 100 is used on relatively long bores where the grout has to be pumped a long distance. Pumping grout through the sacrificial grout injection pipes help insure that there are no grout voids and allows more time to fill the casing with grout. The single end sacrificial grout injection pipe method is accomplished by installing a multiple number of grout injection pipes 102 of varying lengths from the boring end 104 of the casing 106 to the receiving end 108 of the casing. The first injection pipe 102a is installed at the boring end of the casing and goes directly into the casing. Additional injection pipes, each a shorter length than the last, are secured to the bore spacers along with the conduits and loaded into the casing. The injection pipes may be steel, heavy wall HDPE or heavy wall PVC and are normally 2 inches (5.1 cm) nominal to 3 (7.6 cm) inches nominal in diameter.

In this technique, both ends of the casing are bulk headed. The conduits and the grout injection pipes extend through closely fitted holes in the bulkheads. A vent 103 is placed at the top of the receiving end of the casing. Grout is pumped into the first injection pipe 102a until the far nozzle 102b of the second injection pipe has been covered with grout. After the nozzle of the second injection pipe has been covered, the inlet to the first injection pipe is closed and grout is pumped into second injection pipe until the third injection pipe nozzle has been covered with grout. This sequence is repeated until grout discharges from the vent 103 located at the receiving end of the casing. The grout injection pipes are left in the casing and the grout is left to hydrate.

Both techniques require that the grout injection is a continuous, non-stop process. The reason that this injection method is known as the "single end sacrificial grout injection pipe method" is that the grout is pumped into the casing from one end only and the grout injection pipes are sacrificed in the process of pumping the grout into the casing. After the grout has hydrated, hardened, power cables or communication cables are pulled into the conduits. There a number of variations to these two grout injection methods. Almost all of the variations have one thing in common; they require some type of a grout injection pipe or pipes that are utilized similar to the methods described. To describe all of the grout injection methods and variations is beyond the scope of this detailed description.

Pumping the grout requires great forces and imposes heavy side loads on the spacers 14. It follows that the spacers need to securely contain and mount the pipes and conduits of interest. The spacers are typically made from plastic and are relatively thin, typically ½ to ¾ of an inch (1.3 cm to about 1.9 cm) if they are fabricated from PVC or HDPE, and typically 3/16 to 1/4 inch (0.48 cm to about 0.64 cm) if they are fabricated from steel, although some are as thin as 1/8 inch (0.32 cm) and others as thick as 1 inch (2.5 cm). As depicted in FIG. 1a-1b, one way to add strength to the spacers, and to help prevent horizontal movement, is to use them in pairs, as shown. Instead of a single perforated sheet of plastic, spacers typically use two sheets that are substantially identical, the spacers secured to each other by bushings that space the sheets apart and simultaneously hold them together. This adds considerable stability to the spacers. The additional width in the direction of the cables helps prevent turning and bending, as well as longitudinal movement of the spacers. Keeping the spacers in place helps to insure that the conduits have equal separation throughout the installation, and the power cables suffer no deterioration.

Figure 3:
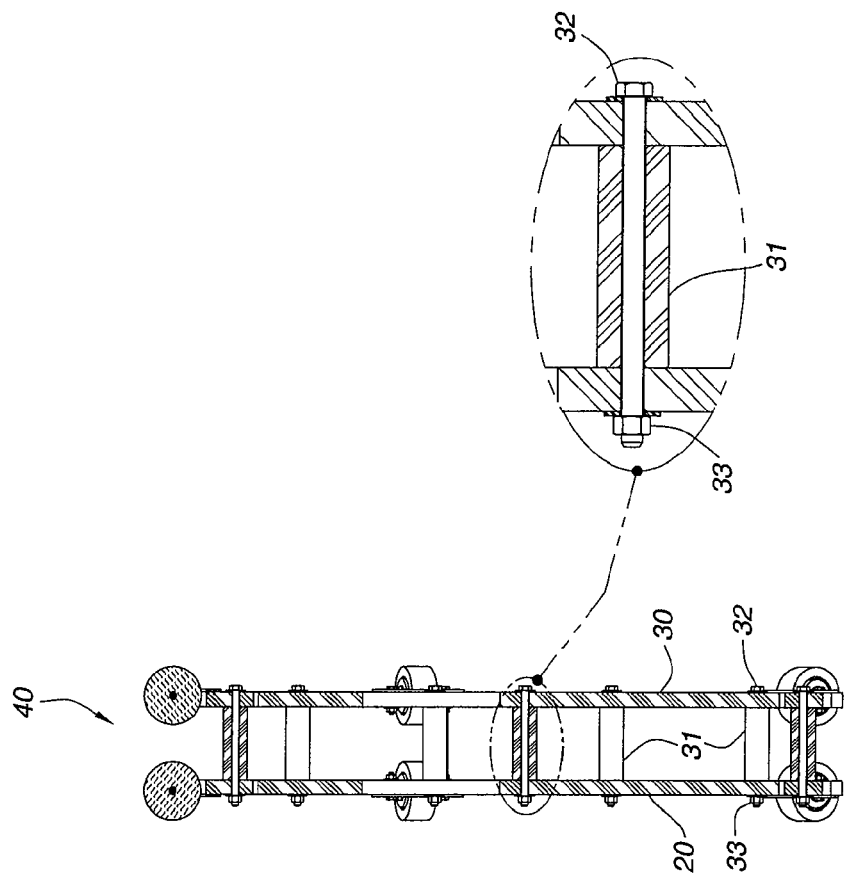
FIGS. 2-3 are plan and elevation views of a first embodiment.
Figure 2:
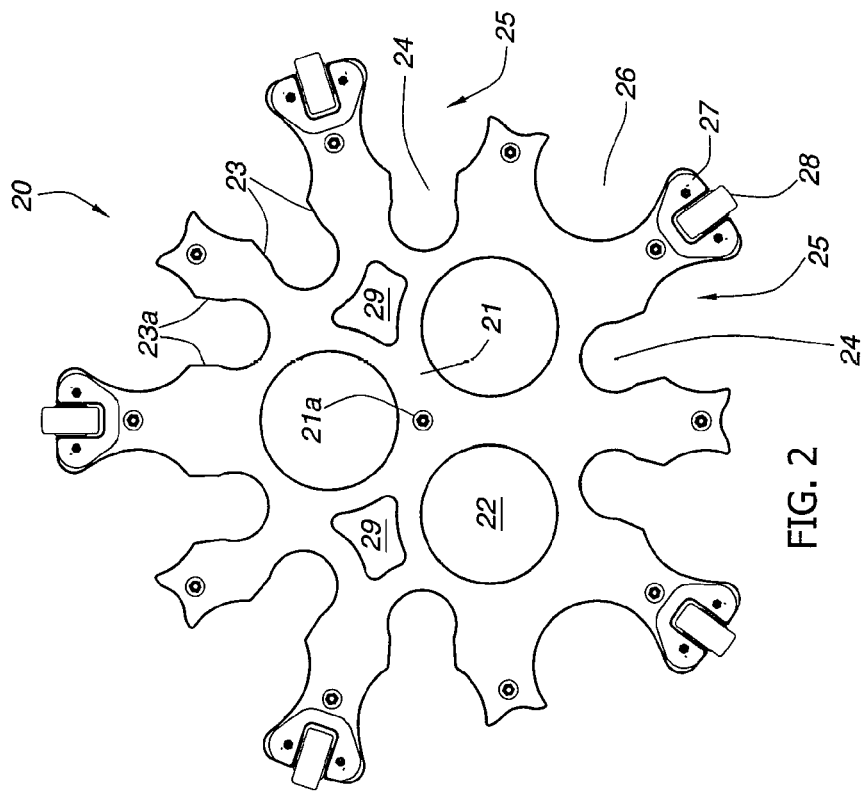

A first embodiment of a side-loading spacer is depicted in FIGS. 2-3. FIG. 2 is an elevation view of a first side loading spacer, of which FIG. 3 is a plan or side view. Side-loading spacer 40 includes two spaced-apart separators 20, 30, separated by a plurality of bushings 31 and secured to each other with a plurality of fasteners, such as bolts 32 and nuts 33. Separators 20, 30 are also known as single-wall spacers. In many installations, it is preferable to join two single-wall spacers into a double-wall spacer, using bushings and fasteners to assembly the two into a relatively rigid assembly. A plurality of single-wall or double-wall spacers are then used to hold conduits apart. Double-wall spacers are generally preferred but single wall spacers may also be used.

Each spacer 20 includes a hub area 21 with a center 21a. Center 21a may or may not be a defined point. In the embodiment of FIGS. 2-3, center 21a includes an orifice for one of the plurality of bolts. Spacer 20 also includes a plurality of outward-directed arms 23. The arms define a first, inner plurality of bores 24, and also a second plurality 25 of bores. The first plurality 24 is closer to center 21a than second plurality 25. The first and second pluralities of bores are interconnected, i.e., they are in radial communication with each other.

Spacer 20 also includes additional bores 26 near the outside of the spacers. Bores 24, 25 and 26 may be loaded by conduits that enter the spaces or bores from the side, rather then from center-loaded or axially-loaded bores 22. In addition, bores or flow holes 29 are used to allow the grout to migrate through the spacer. Spacers may include reinforcement of arms 23 by steel laminating plates 27. The laminating plates 27 or wheel supports reinforce arms 23 and also retain an axle (not shown) for wheels 28. The wheels 28 reduce resistance to the movement of the assembled spacers 40 with their conduits as they are pulled into the steel or other casing. Wheels 28 may be provided on one or more of the arms on all sides, or only on one side, i.e., the bottom two arms (or legs). In other embodiments, skid feet may be used on some of the arms, while in other embodiments, the arms will only support the conduits and the conduits will ride on the inside of the casing during pull-through.

Spacers according to the embodiments of FIGS. 2-3 are very useful because they allow side-loading of conduit onto the spacers, i.e., the spacers may be loaded from the side, with radial insertion of the conduits, rather than requiring conduits to be placed axially into closed holes or orifices in the spacers. When assembling spacers and conduits for hundreds or thousands of feet of length, the difference is highly significant. It is much easier to slip the conduits into side openings, rather than having to manhandle and maneuver them through axial openings only. As seen in FIGS. 2-3, the design allows for a few openings 22 which are intended for axial loading into the spacer. This allows for more complete use of the space available for a given spacer and casing, while minimizing the effort to load the spacers.

Conduits are loaded, preferably sequentially, onto a linear series of spacers 40 before they are placed into the underground casings for which they are designed. In this embodiment, arms 23 are designed for a snap fit of cables or conduits into inner bores 24. Arms 23 have a straight portion 23a just outside inner bores 24. These straight portions 23a have a clearance just less than the diameter of bores 24. Thus, if bores 24 have a nominal 3-inch (7.6 cm) diameter, straight portions 23a have a separation of about 1/16 of an inch (about 0.060 inches or 1.5 mm) less than the nominal diameter. Other snap-fit clearances may be used. When conduit is side-loaded into bore 24, the slight interference results in a snap-fit of the conduit into the bore. This gives a positive indication to the construction crew that the conduit has been loaded. The slight interference also helps to retain the conduit in the spacer when the spacer is maneuvered into the casing or to help load other conduits into the spacer. This assembly of conduits and spacers is commonly termed a duct bank.

Embodiments as described herein are utilized to best advantage in directional bores more than 150 feet (46 m) long that incorporate HDPE conduit. HDPE conduit is somewhat flexible, and the installers prefer to load long lengths of conduit into the bore spacers before pulling the duct back into the casing or Bentonite-filled directionally-bored hole. On conduit-in-casing installations, conduits with outer diameters larger than 5 inches (13 cm) are often supplied in straight lengths, 20 to 40 feet long (6 to 12 m), while smaller conduits, such as 4 inches (11 cm) or less, are often supplied in continuous lengths of 50 to 500 feet (15 to 150 m) on a reel that is 4 to 10 feet (1.2 to 3 m) in diameter. Because HDPE conduit, for example, is supplied in long lengths, it is much easier to load the conduit into the side-loading spacers described herein, rather than having to thread the conduit in an axial manner sequentially through each spacer. Embodiments described herein allow installation of conduit not only on the outer diameter of the spacer, but throughout the spacer. This allows multi-deck or multi-tier side loading of conduit onto the spacers.

This multi-tier side loading of conduits can be used to great advantage when the duct bank is long, 750 feet (230 m) or more, and the sacrificial grout injection pipe method of grout injection is used. The smaller conduits 24 can be used for the sacrificial grout injection pipes and the larger conduits 25 can be used for power and communication cables.

Figure 4:
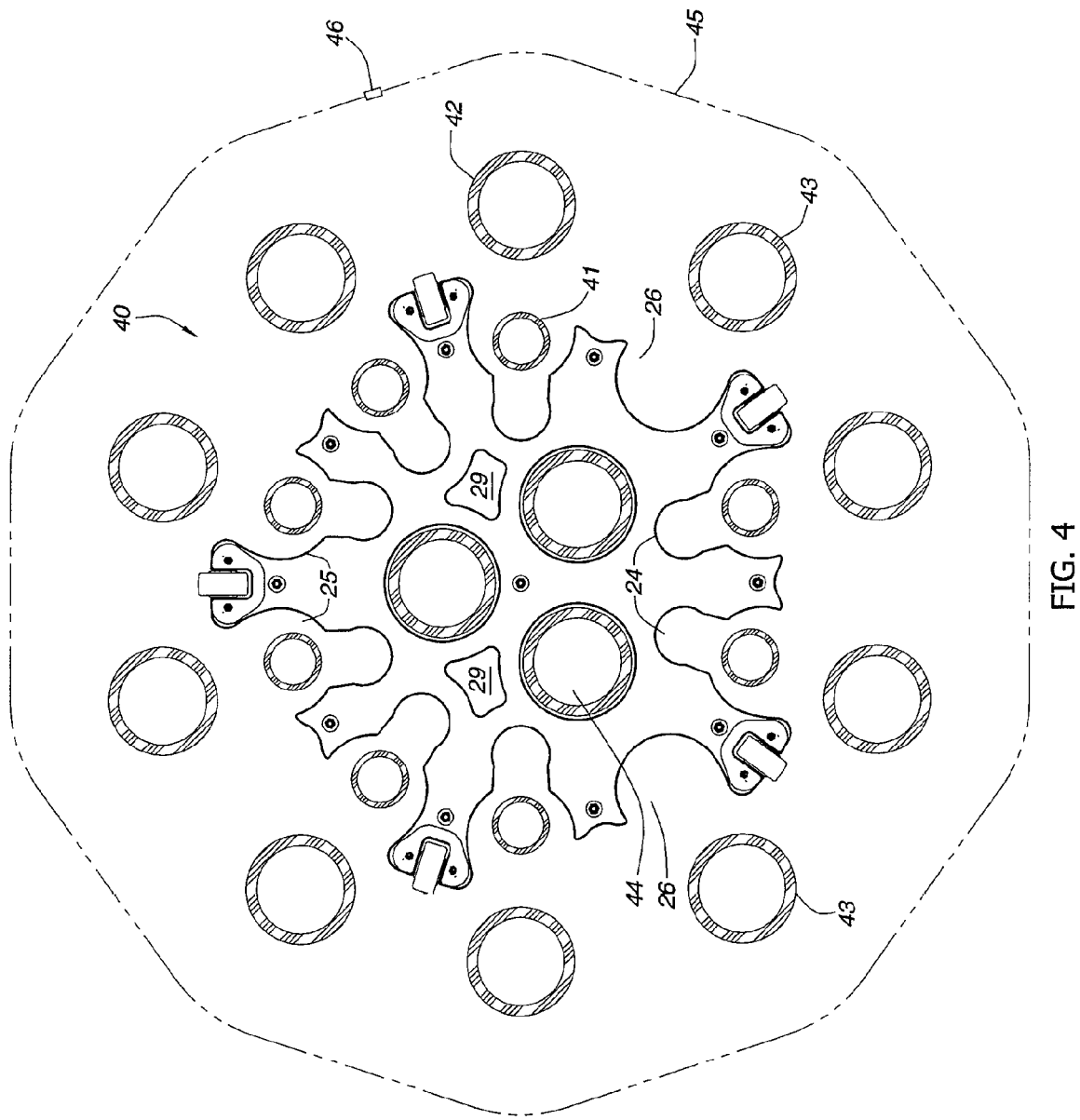
FIG. 4 depicts a use of the embodiment of FIGS. 2-3.

Spacers as described above may thus be loaded with conduits before they are pulled into the casing. An example of a load of spacers and conduits is depicted in FIG. 4. Smaller 3-inch (7.5 cm) conduits 41 are placed into inner bores 24, while 6-inch (15 cm) conduits 42 may be placed into outer bores 25. Conduits 42 are also placed into side-loading but not interconnecting bores 26. Larger conduits 44 are also placed into inner bores 22 to help use the space available. Bores 29 are grout flow holes. After the conduits have been loaded into the spacer 40, the conduits may be banded with a steel or other band 45 and a clip or fastener 46 to help keep the assembly stable for pulling through the steel casing.

Spacers 20, 30 may be made by any of a number of processes used for forming of plastics. The spacers are preferably made from low-cost plastics, such as high-density polyethylene (HDPE), although other plastics or materials may be used. Other materials that may be used include other grades of polyethylene, polypropylene, polystyrene, high-impact polystyrene, nylon, ABS, acetal, and so forth. Even steel spacers may be used. Processes used to fabricate the spacers include routing, laser cutting or water-jet cutting from sheet stacks, injection molding, thermoforming, compression molding, and the like. The parts are not highly stressed, but they do carry heavy loads for very long periods of time. Normal, careful plastics processing techniques should be used, and stress concentrations, such as cracks, chips or gouges should be avoided in making the parts and in assembling the spacers with conduits.

Figure 5:
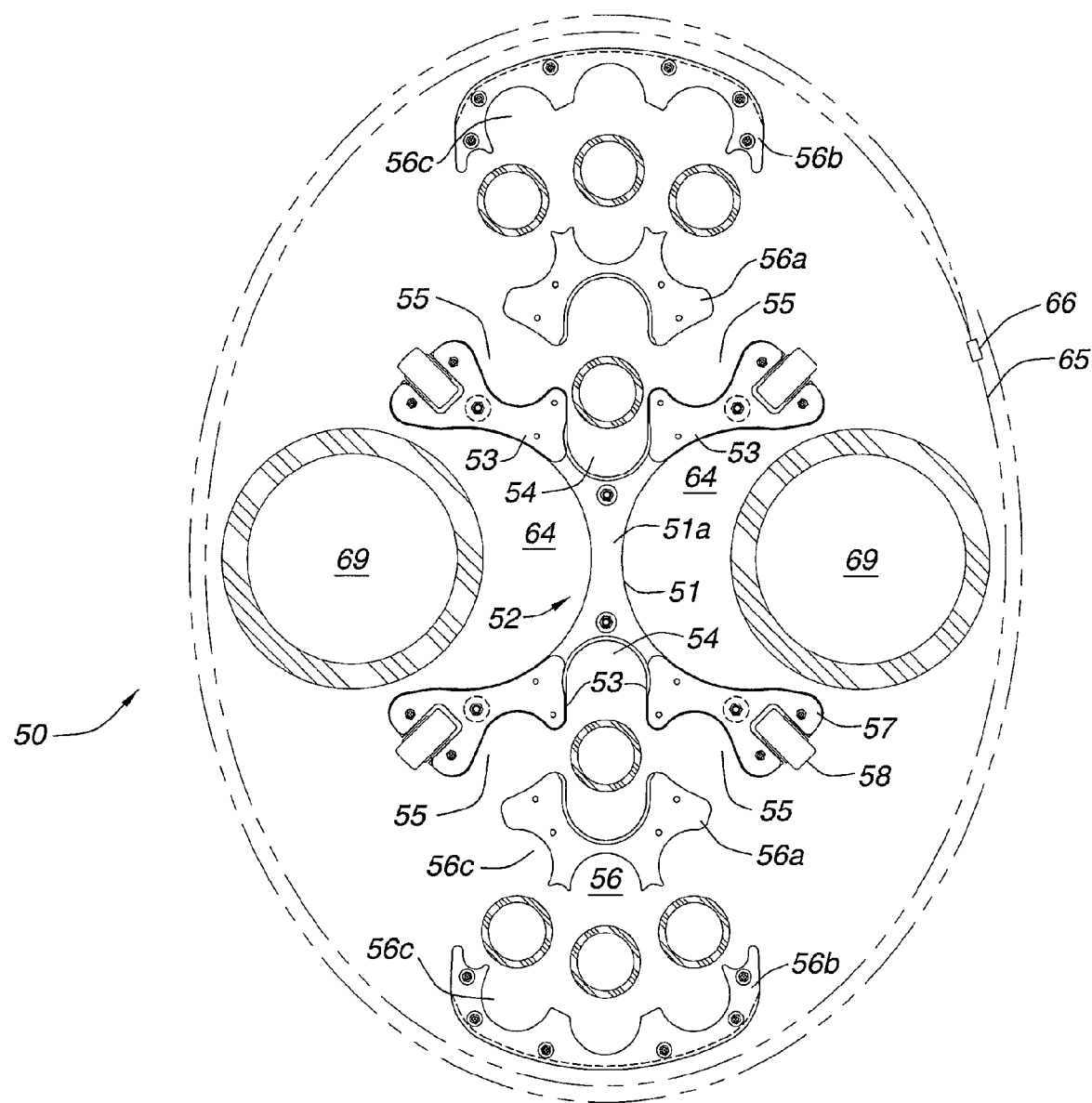
FIGS. 5-6 are views of a second embodiment.
Figure 6:
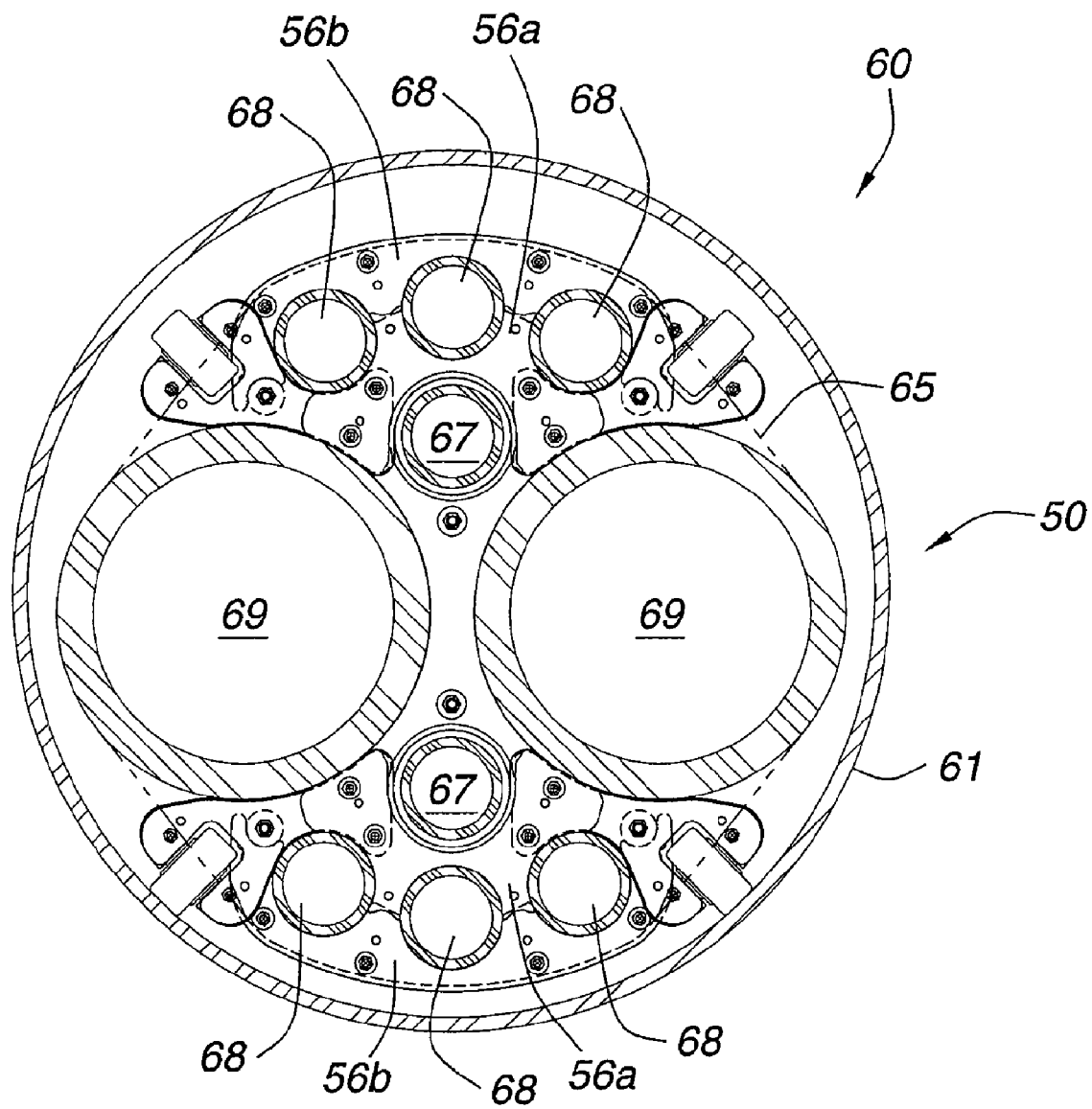

Side-loading spacers may be made from an assembly of parts, rather than from the single-piece construction depicted in FIGS. 2-4. As seen in FIGS. 5-6, side-loading spacer 50 is used as discussed above, with two single wall spacers, and also with optional wheels 58. Side-loading spacer 50 includes a central hub 51, with a center 51a. Arms 53 radiate from the center and the arms, on one side, are formed with curved surfaces for first bores 54 and second bores 55. First, inner bores 54 communicate with second, outer bores 55. On the other side, arms 53 have curved surfaces 52 for another set of bores 64. Arms 53 may also include reinforcing wheel supports or steel laminations 57. Laminations 57 reinforce and strengthen the arms and also support axles (not shown) for wheels 58.

Separation saddles 56a are used to close off inner bores 54 and also to provide structure for additional bores 55. After conduit is placed in inner bore 54, separation saddle 56a may be secured to arms 53 and laminations 57, using fasteners, such as nuts and bolts, rivets, or other fasteners. In one embodiment, separation saddles 56a form first bores 54 that are somewhat larger in diameter than the intended conduits 67 for the bores. This allows additional room in the bore, for instance, if an extractable grout pipe is desired rather than a conduit. When separation saddle 56a has been secured to arms 53, three outer bores 56c are formed. After additional conduits 68 are placed in outer bores 55, a banding saddle 56b may be secured to arms 53. Additional conduits 69 may also be side-loaded into bores 64, and secured with outer band 65. Banding saddle 56b restrains the banding from deforming outer conduits 68.

Band 65 may run in a groove (not shown) on the outer surface of banding saddle 56b, or may simply be placed around the conduits themselves. Band 65 may be made from a non-magnetic material to avoid any coupling or other effect from electricity that is transmitted by the cables in the conduits.

FIG. 6 presents an assembled view of the embodiment of FIG. 5. Side-loading spacer 60 includes two spacers 50 (not visible in FIG. 6), and the entire assembly has been pulled into an underground casing 61. Two large 12-inch (30 cm) conduits 69 have been side-loaded into the spacer, as have two 4-inch (10 cm) conduits 67. The separation saddles 56a and banding saddles 56b are used to secure six 3-inch (7.5 cm) conduits 68. After the conduits are assembled into the spacers, a band 65 secures the conduits to the spacers. As seen in FIGS. 5-6, band 65 runs in a groove in banding saddles 56b and while directly securing larger conduits 69. As can be seen in FIG. 6, there is a good deal of space remaining in casing 61 which is not occupied by conduits or cables, and is also not occupied by the spacers. These voids should be filled with a solid, thermally conductive material in order to provide a heat path for the heat that is typically generated by the power cables contained within the conduits. Grout is the preferred material for this application.

Figure 7:
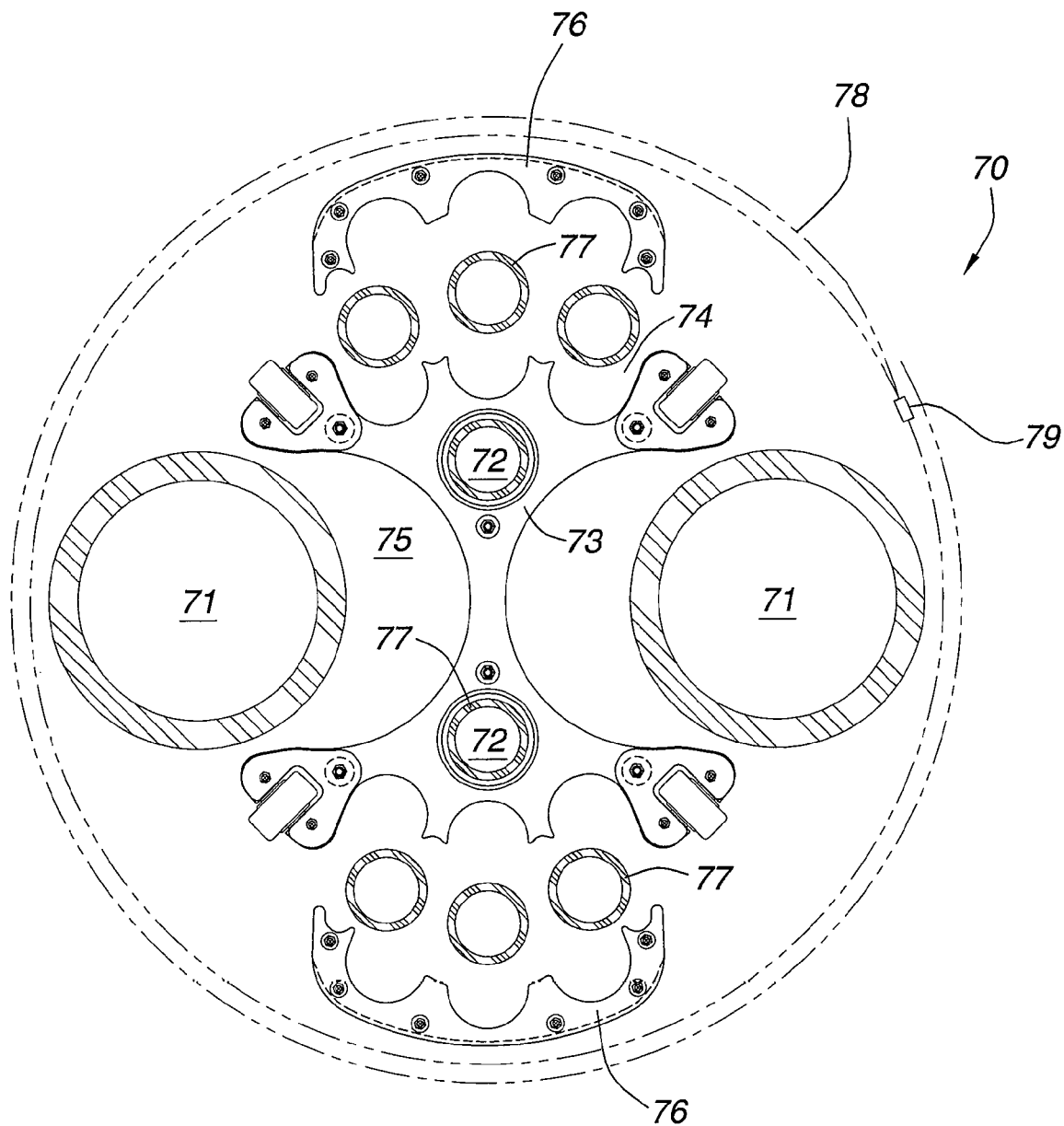
FIG. 7 depicts another embodiment of a side-loading spacer.

Another embodiment of a side-loader spacer is simpler than the other embodiments discussed above. In this embodiment, depicted in FIG. 7, there is no separation saddle or second plurality of bores. This embodiment of a side-loading spacer may include single-wall or double-wall spacers, and also includes at least one banding saddle to secure the conduits in the bores of the spacer or spacers. Side-loading spacer 70 includes arms 73, side-loading bores 74, 75, and additional bores 72. A banding saddle 76 includes bores to allow for conduits 77 in the spacer. Conduits 71 are side loaded into bores 75. Conduits 77 may be side loaded into bores 74 or end-loaded into bores 72. Band 78 and clip or fastener 79 are used to secure the banding saddles 76 and conduits 71 to form a duct bank.

Figure 8:
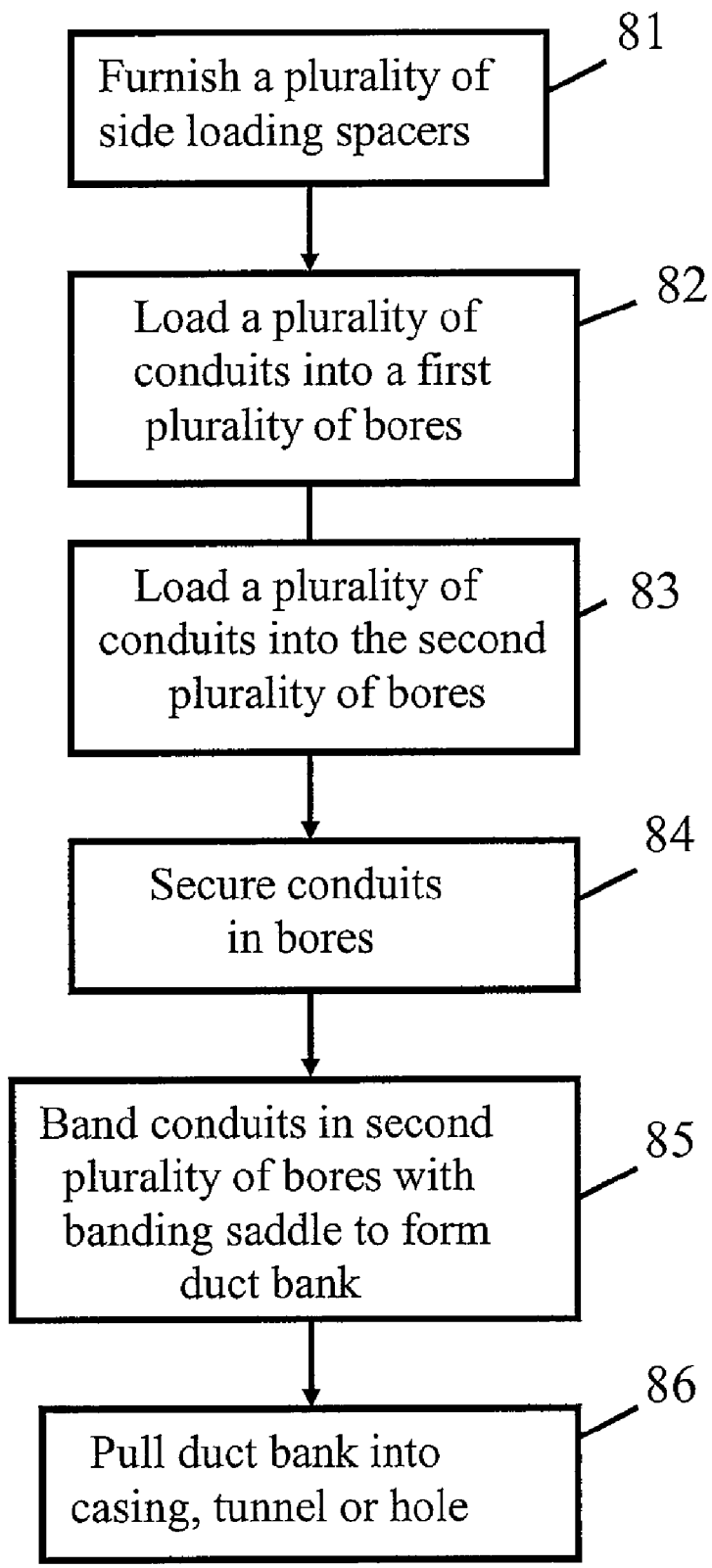
FIG. 8 depicts a method for installing conduits with the new spacers.

As seen, there are many embodiments of side loading spacers. There are also many ways of practicing the invention. One method of using side-loading spacers is depicted in the flow chart of FIG. 8. One step of the method is to furnish 81 a plurality of side-loading spacers. The spacers are then loaded 82 with a plurality of conduits into a first plurality of bores within the spacers. The conduits may then be secured into the bores, as by using snap-fit bores or separation saddles. In some embodiments, the conduits may not be secured. A plurality of additional conduits are then loaded 83 into a second plurality of bores, and the conduits are secured 84 in the bores. Finally, and optionally, the conduits are banded 85 in place to form a duct bank. The banding may be accomplished with a banding saddle, or they may be secured with banding, e.g., a relatively thin, steel or plastic banding material that restrains the conduits in place. If steel is used, it may be non-magnetic, such as 317 L, or only weakly magnetic, such as 316 stainless. The duct bank is then pulled 86 into a casing, an elongated tunnel, or other hole in the ground.

The invention has many embodiments in addition to the few described herein. For instance, the spacers have been described and shown as routed from thermoplastic sheet materials, while they may be fabricated or molded from other materials, such as thermoset materials, wood, or other natural materials. The laminated reinforcements discussed above may retain axles for the wheels, but other reinforcements may be used and other devices provided in order to add reinforcements or wheels to the side-loading separators. For instance, metal or reinforced plastic shoes may be placed on ends of the arms and pinned in place by transverse pins in the arms. Bushings and fasteners have been described as providing ways to secure additional horizontal stability to the two-spacer combinations, but there are additional ways to add stability to the assemblies. For instance, joining side-arms with additional securing points may be used. It is also possible to join two spacers with a fixed horizontal spacing by using clamps with flanges on the out-sides of both spacers. Such clamps could use fasteners through orifices in the clamps and the spacers, or could alternatively use latches that fasten on raised bosses or other surfaces of the spacers. The process has been described as loading conduits into spacers because this is the commercial practice, with the actual power or communications cables later pulled into the conduits. The process would also work if the cables themselves were assembled onto the spacers. The cables are much heavier than empty conduit, but assemblies with cables and the spacers described herein are also possible.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A side-loading spacer, comprising:

a) a first single-wall spacer comprising:

i. a hub having a center;
ii. a plurality of arms radiating from the hub;
iii. a first plurality of bores defined by and between the arms; and
iv. a second plurality of bores defined by and between the arms, wherein the second plurality is spaced a greater distance from the center than the first plurality; and
v. a plurality of wheels attached to at least two of the arms of the single-wall spacer.

2. The spacer of claim 1, further comprising at least one separation saddle configured for mounting over a conduit mounted in one of the first plurality of bores, said separation saddle also configured for mounting at least one additional conduit.

3. The spacer of claim 1, further comprising at least one inner hole between the center and the first plurality, wherein the at least one inner hole does not communicate with the bores of the first plurality.

4. The spacer of claim 1, further comprising a plurality of wheel supports between the plurality of arms and the plurality of wheels.

5. The spacer of claim 1, wherein each bore of the first plurality of bores is in communication with a bore of the second plurality of bores.

6. The spacer of claim 1, further comprising orifices between the first and second pluralities of bores.

7. The spacer of claim 1, further comprising a banding saddle configured for securing to at least one conduit in the spacer.

8. The spacer of claim 1, further comprising a groove on an outer surface of the at least one banding saddle.

9. The side-loading spacer according to claim 1, wherein the side loading spacer further comprises a double-wall spacer with the first single-wall spacer and a second single-wall spacer, and further comprising
a plurality of spacer bushings; and
a plurality of fasteners for assembling and spacing apart the first single-wall spacer and the second single-wall spacer with the plurality of bushings by a length of the bushings, to form an assembly of a double-wall spacer.

10. A side-loading spacer, comprising:
a) a first single-wall spacer and optionally a second single-wall spacer, each single-wall spacer comprising:
i. a hub having a center;
ii. a plurality of arms radiating from the hub;
iii. a first plurality of bores defined by and between the arms; and
iv. a second plurality of bores defined by and between the arms, wherein the second plurality is spaced a greater distance from the center than the first plurality, and wherein each bore of the first plurality is in radial communication with a bore of the second plurality;
v. at least one inner hole between the center and the first plurality, where the at least one inner hole does not communicate with the bores of the first plurality; and if there is a second spacer,
b) a plurality of spacer bushings; and
c) a plurality of fasteners for assembling and spacing apart the first spacer and the second spacer with the plurality of bushings by a length of the bushings, wherein the first single-wall spacer and the second single-wall spacer form an assembly of a double-wall spacer.

11. The spacer of claim 10, further comprising at least one banding saddle for mounting near an outer surface of at least the first single-wall spacer.

12. The spacer of claim 10, wherein each of the second plurality of bores is centered about one of the first plurality of bores, and wherein the arms and the bores are configured to provide spacing between conduits mounted in the first plurality and conduits mounted in the second plurality.

13. The spacer claim 10, further comprising a space between each of the first and second pluralities of bore, a width of the space slightly smaller than a diameter of each of the first plurality of bores; and configured for a snap fit installation of conduit in each of the first plurality of bores.

14. A side-loading spacer, comprising:
a) a first single-wall spacer and optionally a second single-wall spacer, each single-wall spacer comprising:
i. a hub having a center;
ii. a plurality of arms radiating from the hub;
iii. a first plurality of bores defined by and between the arms;
iv. a second plurality of bores defined by and between the arms, wherein the second plurality is spaced a greater distance from the center than the first plurality, and wherein each bore of the first plurality is in communication with a bore of the second plurality; and
v. at least one separation saddle configured for mounting over a conduit mounted in one of the first plurality of bores, said separation saddle also configured for mounting at least one additional conduit; and if there is a second spacer,
b) a plurality of spacer bushings; and
c) a plurality of fasteners for assembling and spacing apart the first spacer and the second spacer with the plurality of bushings by a length of the bushings, wherein the first single-wall spacer and the second single-wall spacer form an assembly of a double-wall spacer.

15. The spacer of claim 14, further comprising a plurality of wheel supports attached to the plurality of arms and further comprising a plurality of wheels attached to the plurality of arms and the wheel supports on at least the first single-wall spacer.

16. The spacer of claim 14, further comprising at least one banding saddle configured for securing at least one conduit to the spacer.

17. The spacer of claim 16, further comprising a groove on an outer surface of the at least one banding saddle.

18. A side-loading spacer, comprising:
a) a first single-wall spacer and optionally a second single-wall spacer, each single-wall spacer comprising:
i. a hub having a center;
ii. a plurality of arms radiating from the hub;
iii. a plurality of bores defined by and between the arms; and
iv. at least one banding saddle configured for securing at least one conduit to the spacer;
v. at least one inner grout flow aperture between the center and the plurality of bores, wherein the at least one inner grout flow aperture does not communicate with the plurality of bores; and if there is a second spacer,
b) a plurality of spacer bushings; and
c) a plurality of fasteners for assembling and spacing apart the first spacer and the second spacer with the plurality of bushings by a length of the bushing, wherein the first single-wall spacer and the second single-wall spacer form an assembly of a double-wall spacer.

19. The spacer of claim 18, further comprising at least one separation saddle configured for mounting over a conduit mounted in one of the plurality of bores, said separation saddle also configured for mounting at least one additional conduit.

20. The spacer of claim 18, further comprising a plurality of wheel supports and wheels attached to at least two of the plurality of arms of at least the first single-wall spacer and optionally to at least two of the arms of the second single-wall spacer.

21. A side-loading spacer, comprising:
a) a first and a second single-wall spacer, each single-wall spacer comprising:
   i. a hub having a center;
   ii. a plurality of arms radiating from the hub;
   iii. a plurality of bores defined by and between the arms; and
   iv. at least one banding saddle configured for securing at least one conduit to the spacer;
b) a plurality of spacer bushings; and
c) a plurality of fasteners for assembling and spacing apart the first and second single-wall spacers with the plurality of bushings to form an assembly of a double-wall spacer.

22. A method of side loading conduit into side-loading spacers for placement into a casing, a tunnel, or a longitudinal arcuate hole, the method comprising:
furnishing a plurality of side-loading spacers, each side-loading spacer comprising:
a) a first single-wall spacer comprising:
   i. a hub having a center;
   ii. a plurality of arms radiating from the hub;
   iii. a first plurality of bores defined by and between the arms; and
   iv. a second plurality of bores defined by and between the arms, wherein the second plurality is spaced a greater distance from the center than the first plurality; and
placing a first plurality of conduits into the first plurality of bores of the plurality of side-loading spacers; and
placing a second plurality of conduits into the second plurality of bores of the plurality of side-loading spacers for underground placement into the casing, the tunnel or the longitudinal hole.

23. The method of claim 22, further comprising securing at least the second plurality of conduits to the side-loading spacers or to themselves by banding the conduits around an outside of the conduits or the spacers.

24. The method of claim 22, further comprising placing or pulling the assembled side loaded conduit and side-loading spacers into a casing.

25. The method of claim 24, further comprising pulling the assembled side loaded conduit, side-loading spacers and casing into the tunnel or the longitudinal arcuate hole previously placed underground.

26. The method of claim 22, further comprising a step of aligning a groove in the spacers with a tongue in the casing to prevent a rifling or corkscrew twisting of the assembled side loaded conduit and side-loading spacers while pulling.

27. The method of claim 22, further comprising pumping grout into the casing, the tunnel, or the longitudinal arcuate hole.

28. The method of claim 22, further comprising pulling the assembled side loaded conduit and side-loading spacers into the tunnel or the longitudinal arcuate hole previously placed underground.

29. The method of claim 22, wherein at least one of the plurality of side-loading spacers is a double wall spacer, comprises a double wall spacer, with a second single wall spacer spaced apart from the first single wall spacer;
a plurality of spacer bushings; and
a plurality of fasteners for assembling and spacing apart the first single-wall spacer and the second single-wall spacer with the plurality of spacer bushings by a length of the bushings to form the double-wall spacer.

30. A side-loading spacer comprising:
a) at least a first single-wall spacer comprising:
   i. a hub having a center;
   ii. a plurality of arms radiating from the hub;
   iii. a first plurality of bores defined by and between the arms; and
   iv. a second plurality of bores defined by and between the arms, wherein the second plurality is spaced a greater distance from the center than the first plurality;
b) at least two conduits within bores from among the first and second pluralities of bores, wherein at least one of the conduits is within one of the second plurality of bores; and
c) a band placed around the at least one conduit within the second plurality of bores to secure the at least one conduit to the single-wall spacer.

31. The side-loading spacer according to claim 30, wherein the side loading spacer further comprises a double-wall spacer with the first single-wall spacer and a second single-wall spacer, and further comprising
a plurality of spacer bushings; and
a plurality of fasteners for assembling and spacing apart the first single-wall spacer and the second single-wall spacer with the plurality of bushings by a length of the bushings, to form an assembly of a double-wall spacer, and wherein the band is placed between the first and second single-wall spacers and around the at least one conduit within the second plurality of bores.

* * * * *